March 19, 1968

R. L. HOOD 3,374,354

INFRARED RADIOMETER SCANNING DEVICE WITH
PREDETERMINED SCAN PATH MEANS

Filed April 12, 1965

INVENTOR.
ROBERT L. HOOD

BY

*Robert Ames Norton*

ATTORNEY

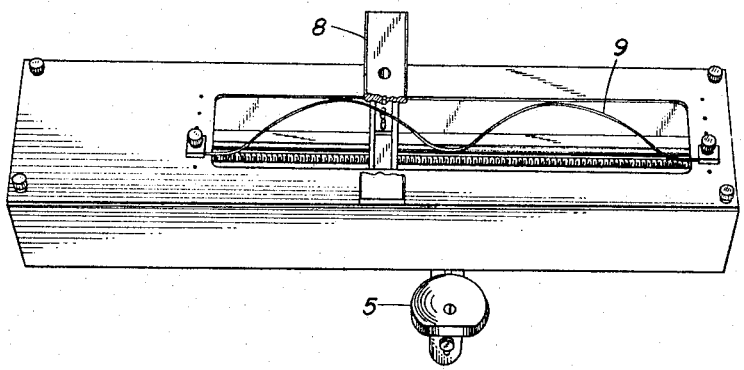
FIG-5
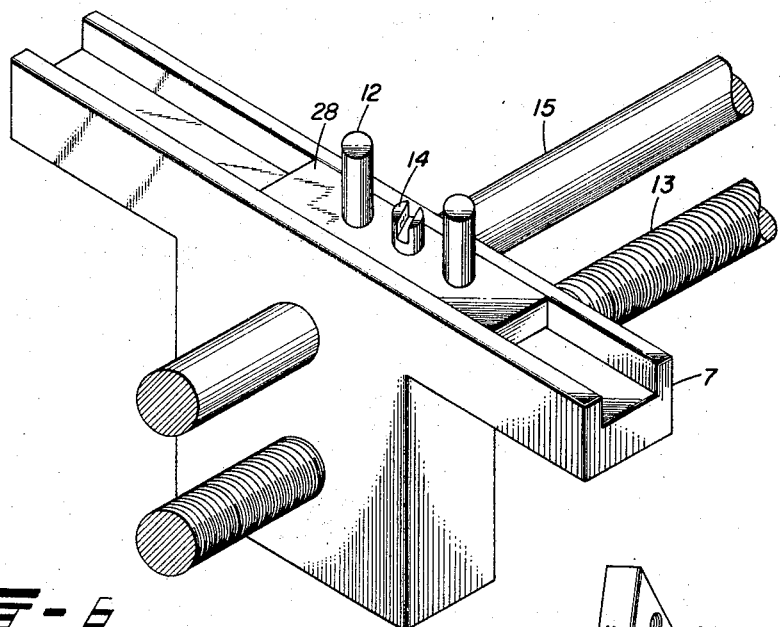
FIG-6
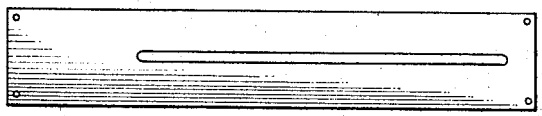
FIG-7
FIG-8
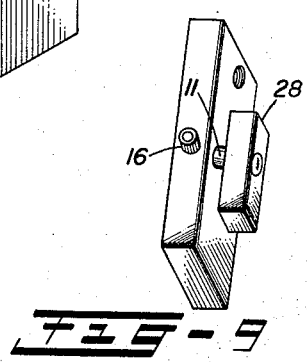
FIG-9
INVENTOR.
ROBERT L. HOOD
BY
*Robert Ames Norton*
ATTORNEY

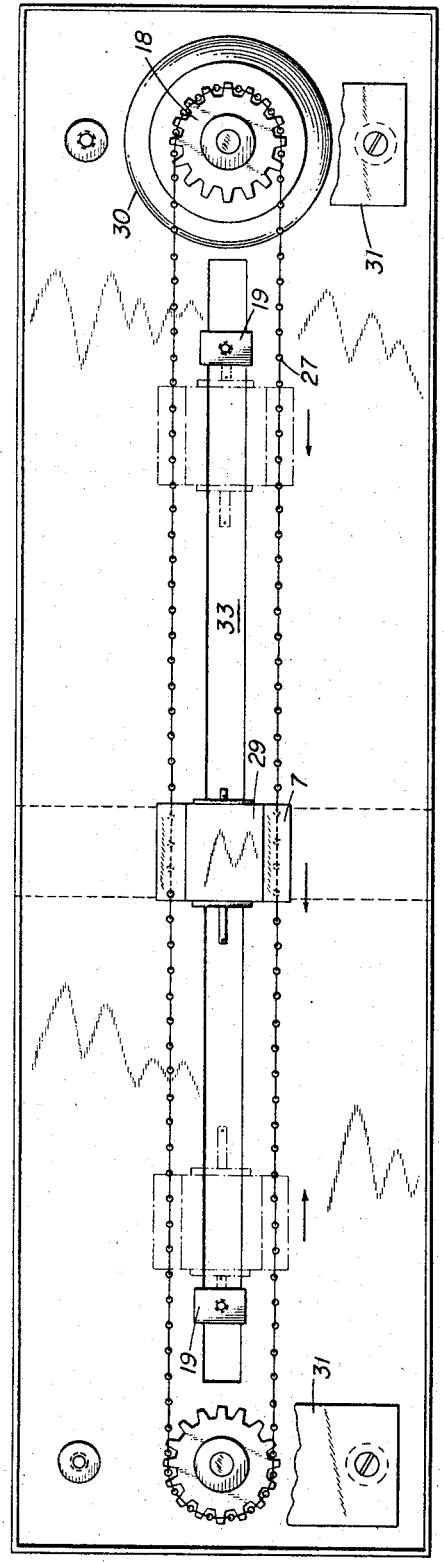
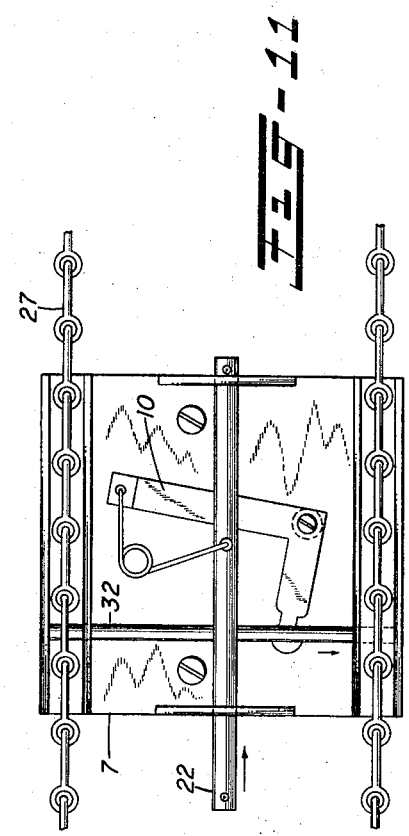

United States Patent Office 3,374,354
Patented Mar. 19, 1968

3,374,354
INFRARED RADIOMETER SCANNING DEVICE WITH PREDETERMINED SCAN PATH MEANS
Robert L. Hood, Byram, Conn., assignor to Barnes Engineering Company, Stamford, Conn., a corporation of Delaware
Filed Apr. 12, 1965, Ser. No. 447,358
12 Claims. (Cl. 250—83.3)

ABSTRACT OF THE DISCLOSURE

An infrared radiometer is mounted on a carriage which can be moved back and forth along a guiding wire or slot which may be straight or curved. This permits scanning across a portion of a patient's body, for example the forehead, while maintaining constant the distance to the patient. In some cases, where the surface is sharply curved, as where a scan across a woman's breasts is needed, a curved track also permits the radiometer to be aimed so that it is always at right angles to the surface of the skin. The radiometer is provided with focusing means having a small field of view so that the scan will have the desired resolution.

Background of the invention

Thermography has achieved extensive success in medical diagnosis. Thermograms of a patient's skin are taken, using infrared thermographs such as those described in the patent to Astheimer and Wormser, No. 2,895,049, and the patent to Barnes, Banca and Engborg, No. 3,169,189. These cameras scan an infrared detector across the selected region of the patient's skin, transform varying infrared radiations into visible light, and scan this across a photographic film, thus producing a photograph in the form of a television raster, the warmer portions of the skin being white or lighter gray, and the cooler portions black or darker gray. A thermograph is a large and expensive machine, and there are certain problems which do not require a picture of an extensive area of the patient's skin. These problems require only a single line scan, or a repeating line scan, which can be recorded on a conventional recorder, or shown on an oscilloscope or similar conventional readout. Two problems of this nature will be described, it being understood that the invention is applicable to any thermography involving a single line scan, and is not limited to the two examples which are simply typical.

Summary of the invention

It has been found that thermograms of a patient's forehead are capable of giving warning of the possibility of a type of stroke or apoplexy caused by the plugging of one or both carotid arteries. This plugging results from the accumulation of fatty deposits on the artery wall, and is analogous to the situation presented in certain cardiovascular malfunctions such as coronary thrombosis, angina pectoris, and the like. The plugging of the carotid artery, as is the case with similar conditions in other blood vessels, does not occur quickly, but builds up over a considerable period of time, usually measurable in months or even a year or more. While it is true that there are strokes which result from rupture of a blood vessel in the brain, a majority of non-fatal strokes result from plugging or partial plugging of the carotid arteries, and, therefore, while the use of the present invention will not give warning of all types of impending strokes, it is useful in the very common form referred to above.

The diagnosis, or warning, is obtained by measuring the skin temperatures across the forehead, including the sinuses. In the case of impending plugging of the arteries, the blood supply gradually decreases, and this results in cooler skin across the sinus in question, or sinuses, and the degree of cooling can be roughly correlated with a period of time in which the stroke might occur. As such strokes can be prevented by vascular surgery on the carotid artery or arteries, the diagnosis is of value, as it permits the surgeon to take action before brain damage has resulted.

As in all medical thermography, the most important factors are not the absolute temperature of areas of the skin, but the relative temperature, compared to other areas or compared to a normal person. When the present invention is used, if one carotid artery is beginning to suffer from fatty deposits, the skin over one sinus will be cooler than over the other. If the amount of arterial restriction is exactly the same in both arteries, it may be necessary to compare the skin record with those of average normal persons. The way in which the information given by the present invention is used is, of course, determined by the judgment of the physician or surgeon in question. The present invention is simply directed to apparatus which permits easily and reproducibly obtaining the records referred to. In and of themselves they are not capable of automatic diagnosis. This, however, is no drawback, as most diagnostic aids are merely aids to the judgment of the physician or surgeon, and the present invention merely gives the physician in a simple and economical manner, another source of information which is useful to him in making a diagnosis.

Another instance where a single scan, or rather a scan across a single line, is useful, is involved in the determination of pregnancy. In a normal woman, a scan across both breasts and the breastbone will show that the skin over the breasts will be somewhat cooler than over the breastbone because of the insulating effect of the fat underlying the skin in the breasts. In other words, such a scan would show lower infrared radiation as it scans across the first breast, then a higher radiation as it crosses the breastbone, and finally a lower temperature as it scans across the other breast. When, however, a woman is pregnant, the hormones resulting from pregnancy cause an increased blood supply to the breasts, which increases their temperature, and hence the temperature of the skin overlying them. Such a scan, therefore, would show higher infrared radiation over each breast, and a relatively lower infrared radiation from the area of the breastbone. The sensitiveness of the test will vary somewhat from one woman to another, but under favorable circumstances can indicate pregnancy after a few weeks. There is one situation in which the present invention cannot be effectively used, and that is where the woman is using hormones as oral contraceptives. These hormones tend to produce the same increased blood supply in the breasts as does actual pregnancy, and in such cases the present invention cannot be used effectively by a physician.

A further advantage of the use of the present invention as a scan across the female breasts, is that it may also show up other indications which would lead the physician to make further and more extensive tests, for example, a complete thermogram. For example, malignancies tend to increase the metabolism of the tissues involved, and can show up as areas of relatively higher skin temperatures. This test is not a one which gives perfect positive correlations, as the rise in temperature may result from other causes. However, it is an additional advantage of the present invention that if the scan shows up areas of quite different skin temperatures, for example areas on one breast of higher temperature which do not correspond to those on the other, this can alert the physician to make further tests and so is an additional byproduct to the primary pregnancy test of this type of use of the present invention.

The instrument of the present invention is quite versatile, and is much cheaper and smaller than a thermograph, so that in many cases a physician may use the present invention in his office or a small group-practice clinic where the large cost and the greater need for skilled operation would render a thermograph undesirable. In general, thermographs, being expensive and relatively large machines, are of primary value in hospitals where the amount of use warrants the greater expense and the more elaborate installation. It is an advantage of the present invention that physicians may use it without having in every case to refer patients to a hopsital for the more elaborate thermogram. In this respect one may consider that the two types of instruments really complement each other, and are not necessarily mutually exclusive. A physician may use the cheaper and quicker apparatus of the present invention for preliminary tests, and only refer for more extensive thermograms those patients where the preliminary test indicates conditions which would require more elaborate thermographic investigation.

Essentially the present invention utilizes a standard portable radiometer of the type which is useful for persons holding it in the hand. However, the present invention scans the radiometer over definite reproducible lines or bands, and avoids the problems of a hand held radiometer, which is more completely dependent on the skill of the user. As the other elements of the present invention are relatively considerably cheaper than an infrared radiometer, it becomes possible to use such an instrument for the additional diagnostic tests of which the two described above are typical examples. At the same time, in a preferred embodiment of the present invention, the radiometer is removable from the rest of the apparatus without extensive disassembly, and therefore the radiometer itself may be used for other purposes by a physician. The fact that the radiometer can be used both in conjunction with the present invention and as such as an added advantage, and contributes considerably to the flexibility of the installation for the average physician.

It might be considered that the present invention would not be really necessary as a hand-held radiometer could be scanned rapidly across the patient. However, problems arise which make the hand-held investigation only useful with a highly skilled physician, and does not give as reliably reproducible results as are possible by means of the present invention. For example, two problems may be considered in medical thermography. The band scanned is fairly small, that is to say, the radiometer is focused to receive radiation from a relatively small area, and radiation from the skin is affected by the path length and also by the direction the radiometer is held. These problems make hand-held use for accurate reproducible scans somewhat difficult. For example, if it is desired to scan across a patient's forehead to determine skin temperature abnormalities over one or both sinuses, spurious responses may be obtained if the radiometer is not turned as it is scanned across the forehead, so that the path length to the skin remains constant, and the radiometer looks at the skin normal to its extent at the point investigated. In the case of the forehead this would require that the radiometer move across in the arc of a circle such that it is always pointing normal to the skin of the forehead, and its distance from the skin is maintained sufficiently constant to avoid any spurious results from too greatly different path lengths which affect both focus and field of view.

In the case of scans across the breasts, for pregnancy or other determinations, the direction that the radiometer views the skin is relatively much less important, but the change in path length can be much greater, particularly in the case of women with relatively large breasts. This requires somewhat different modification of the instrument of the present invention, as will be described below.

On the other hand, any changes in the direction of aim of the radiometer with respect to the patient's skin is relatively unimportant, because if there is a fall-off in radiation as the sides of the breasts are encountered, this does not result in a spurious indication, because it is the relative temperature of the skin over the whole of the breast as compared to that over the sternum which is the most important condition to be determined by this test.

Other conditions of aiming, path length and field of view size change may arise with different line scans in other parts of the body, and it is an advantage of the preferred embodiment of the present invention that it can be rapidly adapted to different paths of movement of the radiometer.

While the radiometer to be used in the present invention is a completely standard commercial radiometer, and therefore the exact design and details of it form no part of the present invention, it should be noted that the standard radiometer may be considered to have the following organization of elements: There are collecting optics, which can be dioptric or catoptric, for example in the form of a focusing cone, which determines the field of view of the radiometer, an infrared detector, such as a thermistor bolometer, a thermopile, or other type of infrared detector useful in the long-wave infrared radiations given off by the human skin, which peak at about $10\mu$, an amplifier for the electrial signal from the detector, and usually means for interrupting or chopping the radiation in order to permit the use of the more satisfactory AC amplifiers. All of these elements are completely conventional in a long-wave infrared radiometer, which is sold extensively commercially for a wide number of purposes. For medical work the radiometer amplifier is normally set by means of suitable controls for radiation intensities that will be encountered, and also for contrast, that is to say, the range of temperatures from maximum to minimum response. None of these elements are changed by the present invention, which is an advantage, as it permits the use of a conventional commercial instrument.

The amplified signal from the radiometer normally goes to a suitable readout device, which may be a meter, a recorder, an oscilloscope, or the like. The present invention really ends when the signal is produced from the radiometer, as the particular readout used is a matter of choice. It is, however, an advantage of the present invention that any conventional type of readout mechanism may be employed.

*Brief description of the drawings*

FIG. 5 is an isometric view similar to FIG. 2 for a modification for scanning across breasts;

FIG. 6 is a detailed enlarged isometric view of a portion of the scanning mechanism of FIGS. 2 and 5;

FIGS. 7 and 8 illustrate different radiometer guide means for the constructions of FIGS. 1, 2 and 5;

FIG. 9 is a detail of a modified radiometer mounting;

FIG. 10 is a plan view of a modified scanning mechanism, and

FIG. 11 is a detailed plan view of the scanning carriage with cover removed.

*Description of the preferred embodiments*

Figure 1:
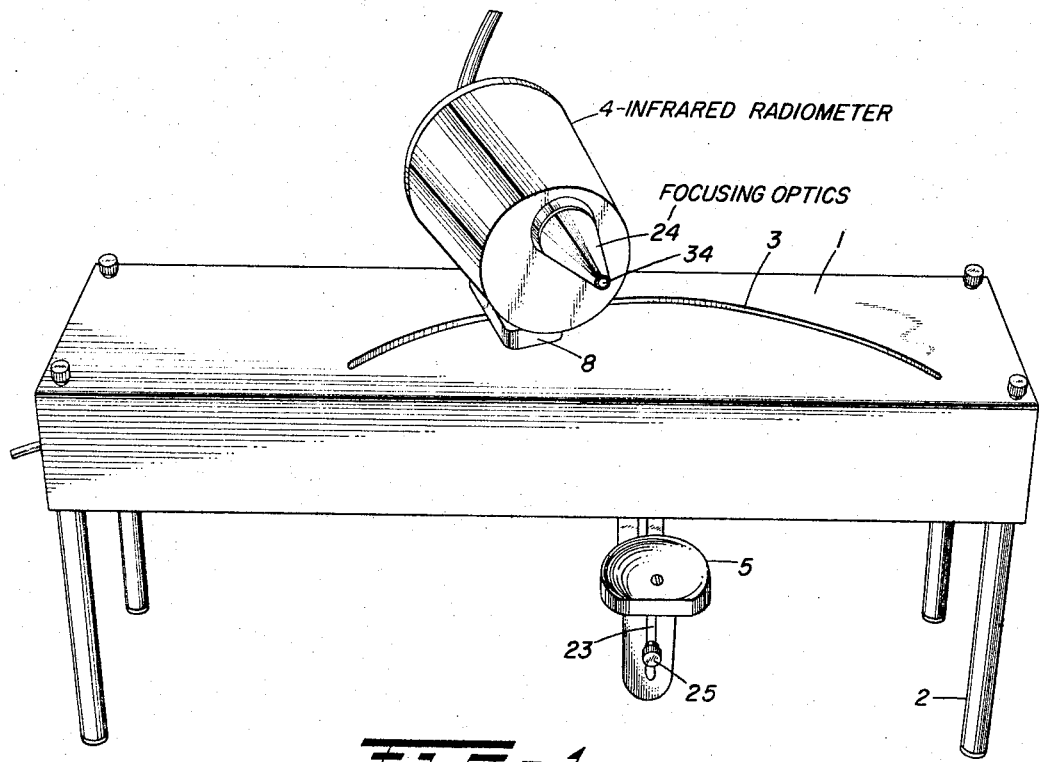
FIG. 1 is an isometric view of an assembled instrument according to the present invention for use in the investigation of skin temperatures across a patient's forehead.
Figure 3:
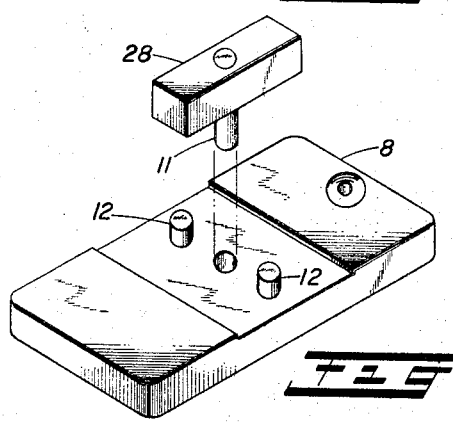
FIG. 3 is a detail, on an enlarged scale, of the elements connecting to the radiometer in FIG. 1.

Turning to FIG. 1, there is shown a plate 1 on the scanning mechanism which is supported by legs 2, the plate being provided with a curved slot 3 along which a radiometer 4 moves. The radiometer is provided with a conventional cone optics 24 which is provided with an opening 34 defining a predetermined small field of view. A chin rest 5 is provided so that the patient can rest his chin thereon, as the shape of the slot 3 is curved for forehead observation. The chin rest may be removed, or moved to one side for breast scans. It is shown readily detachable by means of a slot 23 and a retaining screw 25. The radiometer is mounted on a plate 8, a part of which is also shown in FIG. 5, and this plate in turn is attached to a block 28 (FIG. 3), which fits in a recess of a traveling carriage 7. The recess carries pins 12, and the block 28 mounts therein on the pins 12.

Figure 2:
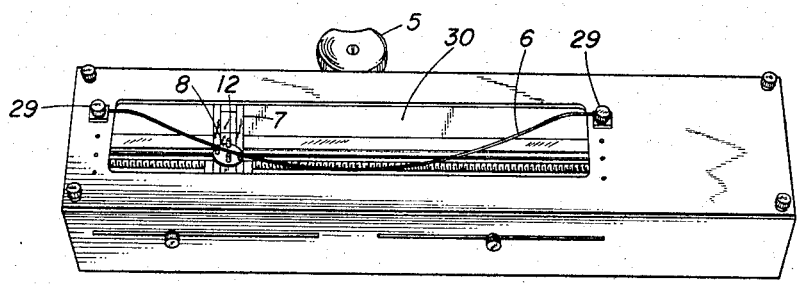
FIG. 2 is a similar isometric view showing the mechanism of a modified instrument.

FIGS. 2, 5 and 6 show the scanning drive, which is effected by means of a lead screw 13 turned by a reversible motor (not shown) which moves a carriage 7 on a guide shaft 15. As the carriage is moved, for example from left to right for a scan, the two pins 12 turn the mounting plate 8 of the radiometer, and also move the block 28 so that the radiometer not only follows the groove as far as distance from the patient's forehead is concerned, but it is always turned toward the center of curvature of the slot 3 which in FIG. 1 should be the approximate center of the curvature of the skin of the forehead. When a scan is completed, the motor is reversed by a microswitch (not shown), and the radiometer scans back. A similar microswitch at the other end will cause the radiometer to repeat the scan, and this continues as long as the machine is turned on.

As the radiometer scans, an output signal is produced, varying with the temperature of the skin across the forehead, and this signal, after amplification, can actuate a recorder, a meter, an oscilloscope, or the like. The physician may observe the different temperatures of the different points of the scan, and if a recorder is used, the pen makes a record.

Figure 4:
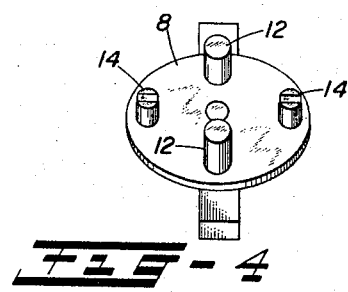
FIG. 4 is a similar detail for FIG. 2.

While it is possible to change plates with different shaped slots, this is less convenient, and therefore the modification shown in FIG. 2 is preferred. Here there is a heavy wire 6 bent in the curve desired, and clamped by screws 29. There is a large opening 30 in the plate 1, and as the carriage 7 is moved across by the screw 13 there is moved a modified follower shown in FIG. 4 which is provided with two slotted pins 14, the slots moving along the wire 6, and two pins 12 as described above. The pins 12 attach to the plate 8 of the radiometer, and therefore as it moves across the scan, its distance from the patient's forehead changes, and it turns to point always normal to the skin in precisely the same manner as is effected by the slot 3 of FIG. 1. However, the ease of changing the curve of the wire 6, to suit any particular or unusual patient, or providing an inventory of a number of wires of suitable curvature, renders this modification much more flexible than that of FIG. 1, and it therefore constitutes a preferred embodiment.

FIGS. 5 and 6 show a modification for scanning across the breasts. The same elements bear the same reference numerals. In this case, however, since it is desired simply to move the radiometer back and forward and to maintain the path distance constant, but not to turn the radiometer, the block 28 is provided with a single slotted pin 14 instead of two in FIG. 4, and the radiometer plate is not turned. The guiding wire which is shown at 9 is of the proper shape, and exhibits much sharper curves. However, the single pin 13 which is journaled in the block 28 can follow fairly sharp bends. On the other hand, the two pins shown in FIG. 4 may bind if the curves are too sharp, but this does not create a problem because the curvature for a single arc as shown in FIGS. 1 and 2 is sufficiently gentle so that no binding results.

Sometimes it is desired to scan back and forth at a constant distance for scanning the skin in portions of the body where it is quite flat. This can be effected either by slots or straight wires as is shown in FIGS. 7 and 8. FIG. 9 shows a somewhat modified cariage in which the screw 16 clamps the pin 11 so that the block 28 cannot turn.

The modification of instruments shown in FIGS. 1 to 9 operates with precision but the cost is higher because reversing motors are relatively more expensive than a motor turning in one direction only. In FIGS. 10 and 11 a modification is shown with a nonreversing motor 30 which turns one sprocket 18 which moves a chain 27 around another idler sprocket. The motor turns always in the same direction.

The carriage 7 on which the radiometer is mounted is provided with a toggle 21 and a toggle actuating bar 22. The toggle moves a bar 32 and in one position this engages chain on one side of the loop and in the other position chain on the opposite side. FIG. 11 shows the toggle in position to lock into the left-hand side chain and shows the position of the locking bar 32 in dashed lines to lock the right-hand chain. In the position shown in FIG. 11 and also indicated in full lines on FIG. 10 the carriage 7 moves to the left. FIG. 11 shows the carriage with the cover 29 removed so that the mechanism is exposed.

There are two stops 19 at the end of the travel and they are adjustable in the slot 33 in which the radiometer mounting moves. For clarity the radiometer is not shown mounted in FIG. 10. It will be noted that the toggle actuating bar 22 projects on the left side as is shown in FIG. 11. When the carriage has moved to the end of its travel, bar 22 strikes the left-hand stop 19 and is thrown to the right. This is shown in phantom on FIG. 10 for the extreme left hand position of the carriage 7. As indicated on this figure by an arrow the toggle locks the carriage to the right hand chain and it is moved to the right. At the oppsite end of its travel the bar 22 strikes the right hand stop 19 and is thrown back to the position shown in FIG. 11 and in phantom in FIG. 10. The left-hand chain is then gripped and the carriage reverses is direction. Covers 31 are shown broken away to protect the sprockets and to prevent the chain from jumping out.

Reference has been made to line scans. This should not be taken to mean that the line of view of the radiometer must always be of the same width as in an ordinary thermograph. In fact, for certain purposes, such as scanning across a woman's breasts, a somewhat wider band, which may be as much as half an inch or more, is of advantage because there are sometimes local anomalies in the skin on a woman's breasts over blood vessels that happen to be unusually near to the surface. Therefore a scan of a band of substantial width which will give the average temperature is sometimes preferable. It is an advantage of the present invention that this can be simply effected by changing the field of view of the radiometer. For example, in the radiometer shown in FIG. 1, a different cone 24 may be used with a different sized opening 34.

I claim:

1. A device for single-line scanning of the infrared emission from skin of mammals comprising, in combination,
    (a) an infrared radiometer provided with means for imaging a restricted field of view,
    (b) means for moving said infrared radiometer back and forth in a single linear, predetermined path with predetermined aiming of said radiometer, said means consisting of a single back-and-forth moving means and reversing means therefor at each end of the predetermined path,
    (c) means for positioning a portion of a mammal's skin at a predetermined distance from said radiometer.
    (d) the radiometer moving means including means for maintaining the distance from radiometer to the skin scanned constant.

2. A device according to claim 1 in which the means for moving the radiometer are means to move it in an arcuate path.

3. A device according to claim 2 in which the radiometer moving means include means for aiming the radiometer at all points in its arcuate path normal to the skin being scanned.

4. A device according to claim 2 in which the radiometer moving means comprise a carriage, means for moving the carriage back and forth in a straight line, an arcuate path-defining means, and means following said arcuate path and connected to the radiometer and capable of sliding in said carriage to maintain radiometer distance from the skin to be scanned constant.

5. A device according to claim 3 in which the radiometer moving means comprise a carriage, means for moving the carriage back and forth in a straight line, an arcuate path-defining means, and means following said arcuate path and connected to the radiometer and capable of sliding in said carriage to maintain radiometer distance from the skin to be scanned constant.

6. A device according to claim 4 in which the means connected to the radiometer maintain constant radiometer aiming during scanning.

7. Means according to claim 5 in which the radiometer connecting means turns as it moves through the arcuate path to maintain the aiming of the radiometer normal to the skin being scanned.

8. A device according to claim 6 in which the means for defining the arcuate path is a bent rod and the means connecting the radiometer are provided with at least one slotted member moving on said rod.

9. A device according to claim 7 in which the means for defining the arcuate path is a bent rod and the means connecting the radiometer are provided with two slotted members moving on the bent rod, whereby said means are turned as the curvature of the rod varies.

10. A device according to claim 1 in which the means for moving the radiometer comprises a lead screw, a carriage threaded to receive said screw, and reversible driving means for said lead screw.

11. A device according to claim 2 in which the means for moving the radiometer comprises a lead screw, a carriage threaded to receive said screw, and reversible driving means for said lead screw.

12. A device according to claim 1 comprising a chain looped about two pulleys, a carriage connected to the radiometer, means for alternately clamping the carriage to one or other side of the chain, and means at the end of the scan travel for unclamping the carriage from one side of the chain and clamping it to the other.

References Cited
UNITED STATES PATENTS 2,895,049    7/1959    Astheimer    250—83.3 X
3,070,695   12/1962   Stickney et al.   250—71.5

ARCHIE R. BORCHELT, *Primary Examiner.*